W. F. SWEET & S. TIDEMAN.
ADDING MACHINE.
APPLICATION FILED APR. 11, 1914.
1,128,546.
Patented Feb. 16, 1915.
3 SHEETS—SHEET 1.
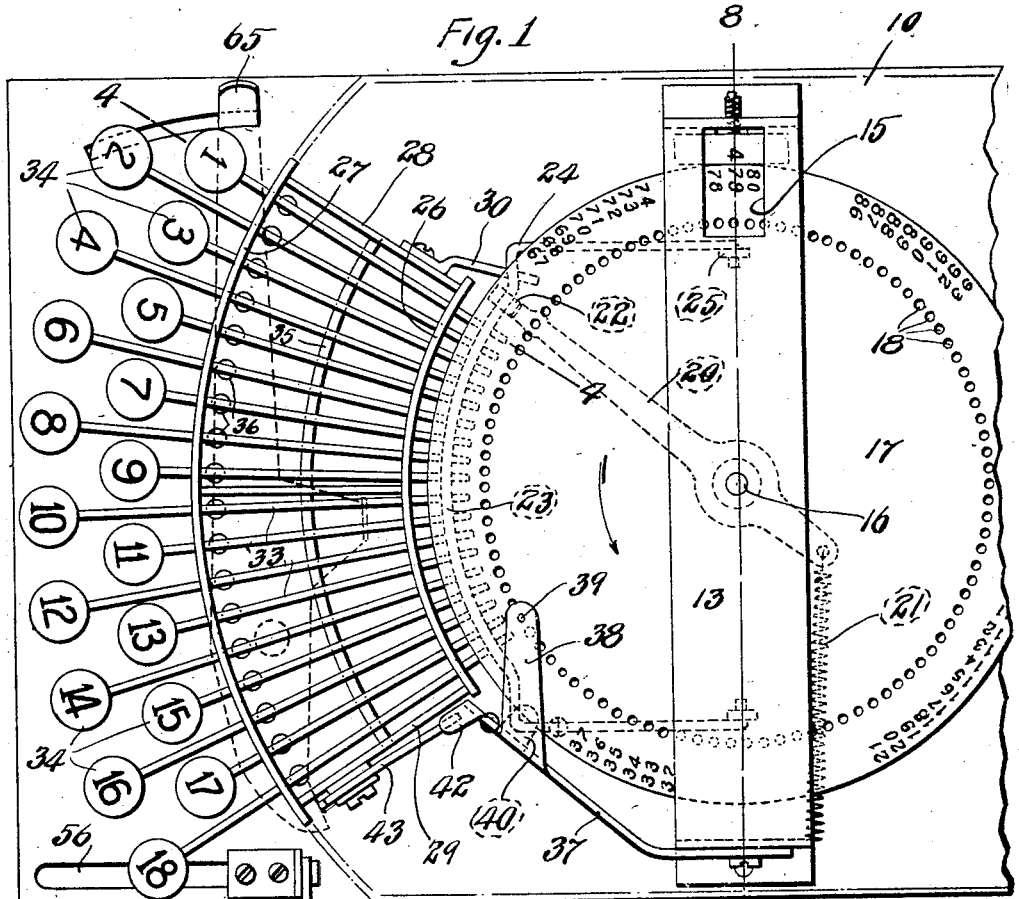
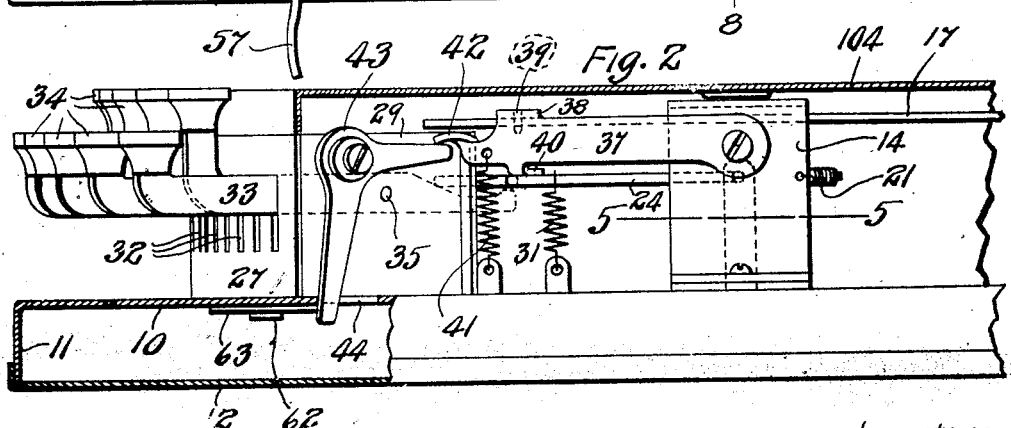
Witnesses
Inventors:
Welcome F. Sweet,
Sven Tideman,
By their Atty.

W. F. SWEET & S. TIDEMAN.
ADDING MACHINE.
APPLICATION FILED APR. 11, 1914.
1,128,546.
Patented Feb. 16, 1915.
3 SHEETS—SHEET 2.
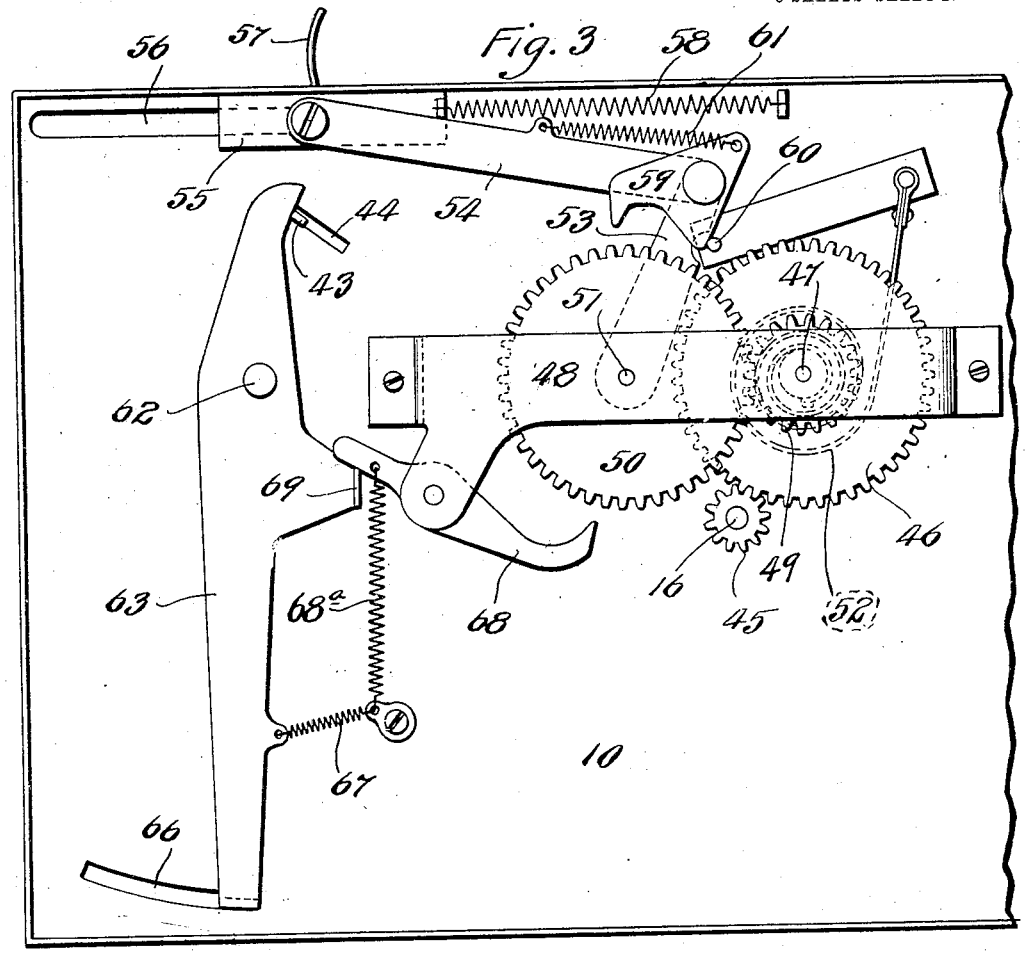
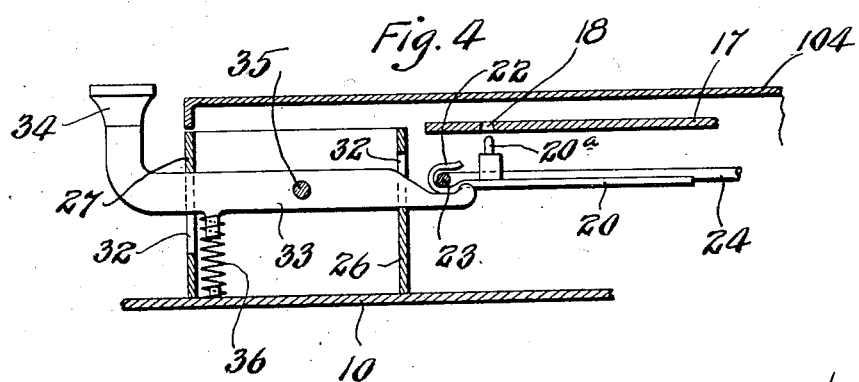
Witnesses
Wm Janus
M. P. Smith
Inventors;
Welcome F. Sweet,
Sven Tideman.
By F. W. Cornwall, Atty.

W. F. SWEET & S. TIDEMAN.
ADDING MACHINE.
APPLICATION FILED APR. 11, 1914.
1,128,546.
Patented Feb. 16, 1915.
3 SHEETS—SHEET 3.
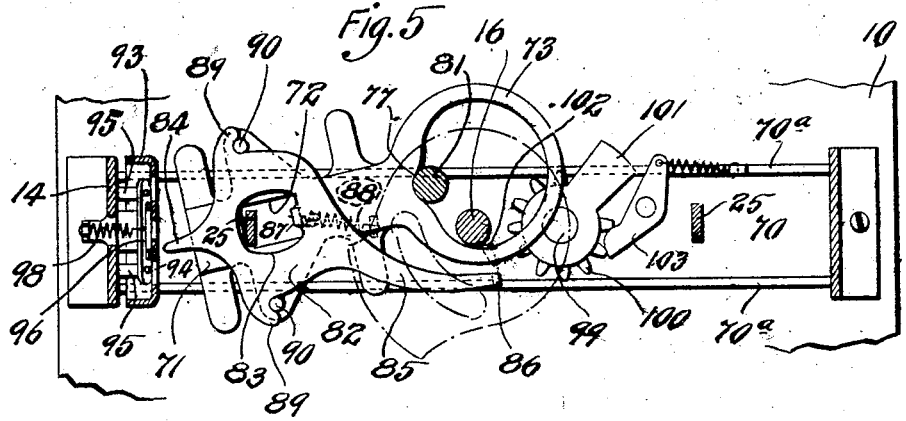
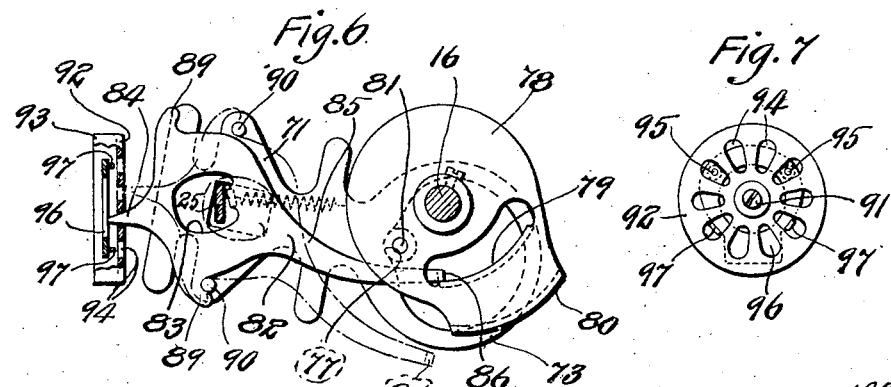
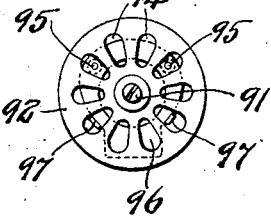
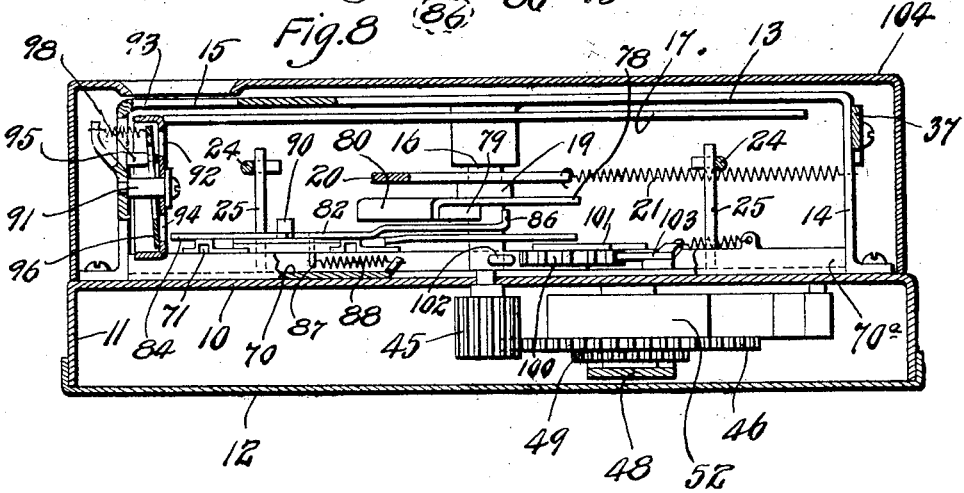
Witnesses
Inventors;
Welcome F. Sweet,
Sven Tideman,

UNITED STATES PATENT OFFICE.

WELCOME F. SWEET AND SVEN TIDEMAN, OF ST. LOUIS, MISSOURI, ASSIGNORS, BY MESNE ASSIGNMENTS, TO SIMPLEX ADDING MACHINE COMPANY, OF SAN ANTONIO, TEXAS, A CORPORATION OF DELAWARE.

ADDING-MACHINE.

1,128,546.     Specification of Letters Patent.     Patented Feb. 16, 1915.

Application filed April 11, 1914. Serial No. 831,304.

*To all whom it may concern:*

Be it known that we, WELCOME F. SWEET and SVEN TIDEMAN, citizens of the United States, residing at St. Louis, Missouri, have invented a certain new and useful Improvement in Adding-Machines, of which the following is a full, clear, and exact description, such as will enable others skilled in the art to which it appertains to make and use the same, reference being had to the accompanying drawings, forming part of this specification, in which—

Figure 1 is a plan view of our improved adding machine with the cover removed. Fig. 2 is a side elevational view of the machine with a portion of the base and the cover in section. Fig. 3 is a view looking at the underside of the base of the machine. Fig. 4 is a detail section taken approximately on the line 4—4 of Fig. 1. Fig. 5 is a horizontal section taken approximately on the line 5—5 of Fig. 2, and showing the transfer mechanism. Fig. 6 is a view similar to Fig. 5, and showing the transfer mechanism in a different position from that shown in Fig. 5. Fig. 7 is an elevational view of the auxiliary disk. Fig. 8 is a cross sectional view taken approximately on the line 8—8 of Fig. 1.

Our invention relates to new and useful improvements in adding machines, particularly of the type disclosed in Patent No. 789,688, dated May 9, 1905, the principal object of our invention being to generally improve upon the construction of the machine shown in said patent and to provide novel means whereby the movement of the revoluble adding disk is positively controlled to prevent over or under rotation.

Further objects of our invention are to provide simple means for transferring the added amounts from the disk to an auxiliary disk, which latter represents a higher order of numerals, and further to provide simple means for resetting both disks or bringing the same back to zero.

With the above and other objects in view, our invention consists in certain novel features of construction and arrangement of parts, hereinafter more fully described and claimed.

Referring by numerals to the accompanying drawings, 10 designates the base of the machine, the same being approximately rectangular in plan view, formed preferably of sheet metal and provided with a depending marginal flange 11, the lower edge of which receives a bottom plate 12. The base thus constructed contains a number of operating parts of the machine and supports other parts.

Arranged above the rear portion of the base is a transversely disposed plate 13, the ends of which are bent downward to form legs 14 which are fixed in any suitable manner to the plate 10. Formed in the left hand portion of this plate 13 is a sight opening 15 through which the numbers on the main and auxiliary disks may be observed.

Mounted for rotation in suitable bearings on the plates 10 and 13 is a vertically disposed shaft 16, to which is secured the main adding disk 17. Arranged on top of this disk and adjacent to the edge thereof are the numerals from 00 to 99 inclusive, and arranged immediately adjacent these numerals is a corresponding annular row of apertures 18. These apertures are preferably counter-sunk from the underside as shown in Fig. 4.

Formed on the central portion of the shaft 16 is a collar 19, and loosely mounted on the shaft above this collar is an arm 20 to the rear end of which is fixed one end of a retractile spring 21, the opposite end being fixed to one of the legs 14. Fixed to the forward portion of this arm and projecting upwardly therefrom is a pin $20^a$ which is adapted to enter the apertures 18 of the main disk. The forward end of this arm is bent into a semicircular loop 22 which partially incloses an arcuate bar 23, the same lying beneath the periphery of the disk 17. The ends of this arcuate bar are bent rearwardly as designated by 24 and the extremities of said rearwardly bent portions are pivotally mounted in standards 25 which project upward from the plate 10 to the sides of the shaft 16. An arcuate key lever frame is arranged in front of the disk and the arcuate bar 23, said frame comprising an inner arcuate wall 26 and an outer arcuate wall 27, the same being concentric with the shaft 16 and the ends of these walls are united by plates 28 and 29.

Fixed to the plate 28 is an inwardly projecting bracket 30 which serves as a pending support and stop to limit the downward movement of the arcuate bar 23. Fixed to one of the arms 24 is the upper end of a retractile coil spring 31, the lower end of which is fixed to the plate 10, thus providing yielding means for maintaining the arcuate bar 23 at its downward limit of movement, and against the stop 30. The arcuate walls 26 and 27 are provided with corresponding vertically disposed slots, such as 32, and arranged in the corresponding pairs of slots are key levers 33, the outer ends of which carry keys 34. In the accompanying drawings I have shown eighteen of these keys, the same being arranged in two rows with the odd numbers in one row and the even numbers in the other. It will be understood, of course, that a greater or less number of keys can be provided, if desired. All of the key levers 33 are fulcrumed on an arcuate rod 35, the ends of which are seated in the plates 28 and 29 and arranged between the forward portion of each key lever and the base 10 is a compression spring 36. The lower portions of all of the key levers 33 project beneath the arcuate bar 23 as shown in Fig. 4.

Pivotally mounted on the right hand one of the legs 14 is the rear end of an arm 37, the forward portion of which terminates adjacent to the plate 29, and formed integral with said arm and overlying the edge of the disk 17 is a finger 38, from the end of which depends a pin 39, the same being adapted to enter any one of the series of apertures 18. Formed integral with the forward portion of arm 37 is an inwardly projecting finger 40 which normally rests on top of the right hand portion of the arcuate bar 23. The upper end of a retractile spring 41 is attached to the forward portion of arm 37, the lower end of said spring being connected to plate 10, thus providing means for yieldingly holding the arm 37 at its downward limit of movement, and with the pin 39 in one of the apertures 18. Formed integral with the forward end of arm 37 is a finger 42, beneath which engages the horizontal arm of a bell crank 43, the same being fulcrumed on the plate 29 and the vertical end of this bell crank projects downward through a slot 44 in plate 10.

Fixed to the lower end of shaft 16 below plate 10 is a pinion 45 which meshes with a large pinion 46, which latter is carried by a spindle 47, the ends of which have bearings in the plate 10 and in a bracket 48, which latter is fixed to the underside of said plate 10. Fixed on the spindle 47 below the pinion 46 is a pinion 49, the same meshing with a pinion 50 which is rigidly fixed to a short shaft or spindle 51, the same having bearings in the plate 10 and bracket 48. Fixed to spindle 47 is the inner end of a spiral spring 52, the outer end of which is fixed to the underside of the base 10, said spring being arranged so as to unwind and drive the pinions 46, 52, and 45, thereby imparting rotary movement to the disk 17 as the same is released by the key actuated mechanism. Loosely mounted on the shaft or spindle 51 is an arm 53 to the outer end of which is pivotally connected the rear end of a link 54. The forward end of this link is pivotally connected to a slide 55 which operates through a slot 56 formed in the right hand portion of the plate 10, and connected to said slide is a finger piece 57. One end of a retractile spring 58 is connected to the rear end of slide 55, the opposite end of which spring is fixed to the plate 10, and thus said slide is normally maintained in its rearward limit of movement or as shown in Fig. 3.

Pivotally mounted on the rear end of link 54 is a pawl 59, the point of which is adapted to engage between the teeth of pinion 50, and under normal conditions or when the slide 55 is at its rearward limit of movement the point of this pawl is maintained out of engagement with the teeth of pinion 50 by the engagement of a portion of said pawl with a pin 60 which depends from the plate 10. The rear end of a retractile spring 61 is connected to the rear end of pawl 59, the forward end of said spring being connected to the link 54. Fulcrumed on a stud 62 which depends from the plate 10 is a lever 63, the right hand end of which normally bears against the rear side of the vertical arm of bell crank 43, the lower portion of which vertical arm projects through slot 44 as hereinbefore described. The left hand end of this lever is bent upward as designated by 65 to form a finger piece, the same operating through an arcuate slot 66 in plate 10. One end of a retractile spring 67 is connected to the left hand portion of lever 63 and the opposite end of said spring is fixed to a stud or bracket depending from plate 10. This spring serves to hold the finger piece 65 normally at the rear end of slot 66 and with the opposite end of said lever against the lower end of the vertical arm of bell crank 43.

Pivotally mounted on a portion of the bracket 48 is a pawl 68, the point of which is adapted to engage the teeth of pinion 50 and the rear end of this pawl normally bears against a finger 69 which depends from the lever 63. One end of a retractile spring 68ª is connected to the rear portion of pawl 68, the opposite end of said spring being attached to a bracket or pin depending from plate 10, and this spring serves to throw the point of pawl 68 into engagement with the teeth of pinion 50 when the finger 69 is disengaged from the rear end of said pawl.

The mechanism just described serves as means for resetting or the bringing back to zero of the main and auxiliary disks of our improved machine.

The means for transferring from the main to the auxiliary disk will now be described. Arranged on the plate 10 immediately beneath the plate 13 is a transversely disposed plate 70, the side edges of which are turned upward to form parallel ribs or flanges 70ª. Arranged for sliding movement on top of the left hand portions of the ribs or flanges 70ª is a plate 71 in which is formed an opening 72 through which the left hand one of the standards 25 projects, and formed integral with the right hand end of this plate is a ring 73 which incloses the shaft or spindle 16. Formed on the inner edge of this ring and in alinement with the longitudinal axis of the plate 71 is a notch 77. Fixed on the shaft 16 just below the collar 19 is a plate 78, and depending therefrom is an inner arcuate flange 79 and an outer arcuate flange 80. Depending from the disk 78 is a pin 81 which extends downward within the ring 73 and as the disk 78 is rotated this pin engages in the notch 77 and oscillates or shifts the plate 71 as will be hereinafter more fully described. A lever 82 is loosely mounted on top of the plate 71, which lever is provided with an opening 83 which corresponds with the opening 72 and accommodates the corresponding standard 25 and formed integral with the left hand end of this lever is a finger 84. The right hand portion of lever 82 is curved forward to form an arm 85 and the end of this arm is bent upward to form a finger 86 which is adapted to engage either one of the flanges 79 and 80. Formed integral with the lever 82 and depending through the openings 83 and 72 is a finger 87 to which is attached one end of a retractile coil spring 88, the outer end thereof being attached to the plate 70. Formed integral with the sides of lever 82 and near the forward end thereof are hooks 89 which are adapted to receive bearing pins 90, the same being seated in extensions on the sides of plate 71. Loosely mounted on a pin 91 which projects inwardly from the left hand one of the legs 14 is a disk 92; the edge of which is bent to form a rib or flange 93 and arranged on the face thereof are the numerals from 0 to 10 inclusive. Formed in the web or body of the disk 92 is a series of ten apertures 94, the same corresponding with the numerals on the rim of said disk. Loosely mounted upon pins 95 which project inwardly from the left hand leg 14 is a disk 96, the lower portion of which frictionally engages the inner face of disk 92 and projecting from the disk 96 outwardly through a pair of the apertures 94 in disk 92 are pins or fingers 97. The top of disk 96 is drawn toward the corresponding leg 14 by means of a retractile coil spring 98, the outer end of which is attached to said leg 14.

The means employed for locking the disks against movement after 1000 has been added by the machine will be now described. Journaled on a suitable stud 99 which projects upward from plate 70 adjacent to the shaft 16 is a pinion 100 having ten teeth and fixed to said pinion is an outwardly projecting arm 101 which, when said pinion has made a complete revolution, engages against the shaft 16. Projecting outward from the shaft 16 is a pin or single tooth 102 which is adapted to engage between the teeth of pinion 100 and move the same a distance of one tooth each time the shaft 16 is completely rotated. A spring actuated detent 103 is mounted on the plate 70 adjacent to pinion 100 and the free end of said detent engages between the teeth of said pinion to yieldingly hold the same in proper position. The main disk 17 and the rear portions of key levers 33 are inclosed in a suitable sheet metal housing 104, the walls of which rest upon the plate 10 and the front wall of this housing coincides with the outer arcuate wall 27 as seen in Figs. 1 and 2. This housing is provided with a sight opening which coincides with the opening 15 in plate 13.

The operation of the machine is as follows: At the beginning of the adding operation the main and auxiliary disks are positioned so that zeros appear through the sight opening in the housing and the opening 15 in plate 13. The spring 52 which is wound up when the disks are so positioned exerts power to rotate the disk 17 anti-clockwise or in the direction indicated by the arrows on said disk in Fig. 1, but said disk is held against movement by the engagement of pin 39 in one of the apertures 18. A key lever representing the first number to be added is depressed and the inner end of said key lever is moved upward, thereby carrying with it the arcuate bar 23 and the outer end of arm 20. As said arm is thus elevated the pin 20ª will engage in one of the apertures 18 and as the arcuate bar 23 reaches its upward limit of movement the right hand end of said bar engages the finger 40 of arm 37, thereby elevating said arm and consequently withdrawing the pin 39 from the aperture in which it has been engaged. The power of spring 52 will now act through pinions 46 and 45 to partially rotate shaft 16 and the parts carried thereby, and as a result the main disk 17 will be partially rotated and the number corresponding to the key lever depressed will appear through the opening 15 and corresponding opening in the housing 104. During this movement the loop 22 on the forward end of arm 20 slides along the arcuate bar 23 until it engages the rear end of the key lever which has been depressed, and this forms a stop to limit the movement of the disk. As the pressure of the finger on the actuated key lever is removed the corresponding spring 36 restores the key lever to its normal position, thereby lowering its rear end and permitting the arcuate bar to move downward. As this action takes place the arm 37 moves downward, thereby reengaging pin 39 in one of the apertures 18 and immediately after this engagement takes place pin 20ª disengages from the aperture in which it has been engaged and immediately thereafter spring 21 acts to return the forward end of said arm to the left hand end of arcuate bar 23. These movements are repeated as the succeeding numbers are added into the machine, and during these subsequent movements the disk 78 moves around with shaft 16 and the depending lug or pin 81 passes around within the right hand portion of ring 73.

Just prior to the time of the completion of a complete revolution of the disk 17 the pin 81 engages in the notch 77 and moves the plate 71 toward the left hand, and as said plate is thus moved the lever 82 is likewise moved toward the left hand by reason of the engagement of the edge of plate 71 to the rear of aperture 70 against the depending finger 87 of lever 82. At this period in the operation or just before the transfer to the auxiliary disk takes place the rear arcuate flange 79 engages against the upwardly projecting finger 86 on the rear end of arm 85, and as the movement of disk 78 continues the lever 82 will be swung or shifted differentially upon the plate 71 by reason of the engagement with one of the pins 90 acting as a fulcrum, and which movement is simultaneous with the movement of plates 71 and lever 82 toward the left hand. During this shifting movement the finger 84 enters one of the lowermost apertures 94 of link 92, thereby engaging the lower portion of disk 96 and moving the same inwardly to disengage the fingers 97 from the apertures in which they have been seated. This point in the operation corresponds with the completion of a revolution of the disk 17, and as said revolution is completed the finger 86 rides off the inner arcuate flange 79, thereby permitting the lever 82 to swing from the position shown by solid lines to the position shown by dotted lines in Fig. 6, said lever acting under the influence of retractile spring 88, and thus the finger 84 in engaging with disk 92 moves the same one space or a distance corresponding to one of the apertures in said disk, thereby transferring from the disk 17 and indicating 100 upon the auxiliary disk 92. As the lever 82 is drawn toward the right hand under the influence of spring 88 the finger 84 is withdrawn from the disk 92, thereby permitting the lower portion of disk 96 to move into engagement with the lower portion of said disk 92 and reëngaging the fingers 97 in a pair of the apertures 94, and as a result disk 92 is locked against movement in either direction until the succeeding transfer operation takes place. As the shaft 16 carrying disk 17 makes a complete revolution the pin 70 or tooth 10 engages between the teeth of pinion 100, thereby moving the latter a distance of one tooth so that when said shaft 16 and disk 17 have made ten complete revolutions which exhaust the capacity of the machine, the arm 101 will be brought into engagement with the shaft 16, thereby forming a stop and preventing further rotation of the pinion 100 by the pin 102 on said shaft 16. As a result, the machine is locked against operation after a total of 1000 has been added thereinto.

When it is desired to restore the disks 17 and 92 to their normal or zero positions, the operator engages finger piece 65 of lever 62 and draws said finger piece through slot 66 thereby swinging the lever 63 upon its fulcrum and causing the forward end of said lever to engage the lower end of the vertical arm of bell crank 43 and move the same through slot 44. As said bell crank is thus actuated the horizontal arm thereof engages finger 42 and elevates same, consequently withdrawing pin 39 from the aperture 18 in which it has been seated. This action frees or unlocks disk 17 and at the same time lug or finger 69 on lever 63 is drawn away from the rear end of pawl 68 so that the point thereof moves into engagement with the teeth of pinion 50. With the parts thus positioned the operator engages finger piece 57 and draws slide 55 to the forward end of slot 56 and as a result arm 53 is swung upon its pivot point and pawl 59 is drawn away from pin 60 and immediately under the influence of spring 61 the point of said pawl engages the teeth of pinion 50. As these movements take place the pawl 59 partially rotates pinion 50 and the motion thereof is transmitted through pinions 49 and 46 to shaft 47, thereby rewinding spring 52 which was previously unwound during the adding operations of the machine. Simultaneously, the reverse rotary movement imparted to pinion 46 is transmitted to pinion 46 and shaft 16, and as a result the disk 17 is brought back to zero point. The normal or zero position of the main and auxiliary disks is determined by the relative positions of the arm 101 with respect to the shaft 16 and the position of finger 102 with respect to the teeth of pinion 100. During the restoring of the disks to zero point the transfer mechanism will be reversely actuated, and during the reverse rotary movement of disk 78 the finger 86 on arm 85 will be engaged by the arcuate flange 80 in effecting the reverse rotation of the auxiliary disk 92. It will be understood that where several hundreds have been added into the machine, it will necessitate several actuations of the finger piece 57 to restore both disks to zero.

Our improved adding machine is of simple construction, can be cheaply produced, is adapted for a wide variety of uses and provides simple and efficient means for accurately and quickly adding up columns of figures.

It will be readily undestood that minor changes in the size, form and construction of the various parts of our improved adding machine can be made and substituted for those herein shown and described, without departing from the spirit of our invention, the scope of which is set forth in the appended claims.

We claim:

1. In an adding machine, a horizontally disposed revoluble adding disk, means for moving the same a predetermined distance, an auxiliary disk mounted for rotation in a vertical plane adjacent to the edge of the first mentioned disk, means including a spring pressed pin carrying plate for normally holding the auxiliary disk against movement, and a spring held pivotally mounted sliding finger which is actuated by the first mentioned disk upon the complete rotation thereof for releasing the auxiliary disk holding means and partially rotating said disk.

2. In an adding machine of the class described, the combination with a horizontally disposed revoluble adding disk, of means for actuating said disk, an auxiliary disk arranged for rotation in a vertical plane adjacent to the edge of the first mentioned disk, the edge of which auxiliary disk bears numerals, there being a series of apertures formed in the body of said auxiliary disk, and means actuated by the first mentioned disk for engaging the apertures in the auxiliary disk to partially rotate the same.

3. In an adding machine of the class described, an auxiliary adding disk mounted for rotation, there being a series of apertures in the body of said disk, a spring held plate positioned to the rear of said auxiliary disk, pins on said plate, which pins normally project through certain of the apertures in the auxiliary disk, and means adapted to enter one of the apertures in the auxiliary disk and engage the plate to release the same from said auxiliary disk, and which releasing means also imparts partial rotary movement to said auxiliary disk.

4. In an adding machine of the class described, a shaft, an adding disk carried thereby, a pinion on the shaft, a second shaft, a gear wheel thereon, which gear wheel meshes with the pinion on the first mentioned shaft, a spring coöperating with the second shaft, which spring normally tends to rotate both shafts and the disk, and manually operable ratchet and pawl means coöperating with the second shaft for reversely rotating the same to rewind the spring thereupon.

In testimony whereof we hereunto affix our signatures in the presence of two witnesses, this 24th day of March, 1914.

WELCOME F. SWEET.
SVEN TIDEMAN.

Witnesses:
M. P. SMITH,
M. A. HANDEL.